United States Patent
Remy et al.

(10) Patent No.: US 11,328,132 B2
(45) Date of Patent: May 10, 2022

(54) TRANSLATION ENGINE SUGGESTION VIA TARGETED PROBES

(71) Applicant: International Business Machines Corporation, Armonk, NY (US)

(72) Inventors: Sekou Lionel Remy, Nairobi (KE); Charles Muchiri Wachira, Karatina (KE); Fiona Mugure Matu, Nairobi (KE); Samuel Osebe, Nairobi (KE); Victor Abayomi Akinwande, Karen (KE); William Ogallo, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/564,370

(22) Filed: Sep. 9, 2019

(65) Prior Publication Data

US 2021/0073339 A1    Mar. 11, 2021

(51) Int. Cl.
*G06F 40/45* (2020.01)
*G06F 40/58* (2020.01)

(52) U.S. Cl.
CPC .............. *G06F 40/58* (2020.01); *G06F 40/45* (2020.01)

(58) Field of Classification Search
CPC .......... G06F 40/30; G06F 40/58; G06F 40/51; G06F 16/3344; G06F 16/3347; G06F 16/248; G06F 40/279; G06F 40/45; G06F 16/3337; G06F 16/951; G06N 3/0445; G06N 3/0454; G06N 3/049; G06N 3/08
See application file for complete search history.

(56) References Cited

U.S. PATENT DOCUMENTS

| | | | |
|---|---|---|---|
| 8,326,598 B1 | 12/2012 | Macherey et al. | |
| 8,935,148 B2 | 1/2015 | Christ | |
| 8,990,064 B2* | 3/2015 | Marcu | G06F 40/58 704/2 |
| 9,098,488 B2 | 8/2015 | Hamid et al. | |
| 9,465,797 B2 | 10/2016 | Ji | |
| 9,928,236 B2 | 3/2018 | Dixon et al. | |
| 10,635,727 B2* | 4/2020 | Liu | G06F 40/30 |
| 2005/0055217 A1* | 3/2005 | Sumita | G06F 40/45 704/277 |
| 2007/0219777 A1* | 9/2007 | Chu | G06F 40/263 704/9 |

(Continued)

OTHER PUBLICATIONS

Shi et al , Two Phase Evaluation for Selecting Machine Translation Services, published: 2012, publisher: European Language Resources Association (ELRA), pp. 1-8). (Year: 2012).*

(Continued)

*Primary Examiner* — Wilson W Tsui
(74) *Attorney, Agent, or Firm* — Shimon Benjamin, Esq.; McGinn I.P. Law Group, PLLC.

(57) ABSTRACT

A translation-engine suggestion method, system, and computer program product include identifying probes for third-party translation-engines for an input text, segmenting sections of the input text into a plurality of segments according to the identified probes, fragmenting the input text into fragments according to the segments, applying each fragment to the identified probe using the corresponding third-party translation-engine, and outputting a translation by combining each fragment.

19 Claims, 7 Drawing Sheets

(56) References Cited

U.S. PATENT DOCUMENTS

| | | | |
|---|---|---|---|
| 2009/0083023 A1* | 3/2009 | Foster | G06F 40/45 |
| | | | 704/3 |
| 2012/0035912 A1* | 2/2012 | Litvak | G06Q 10/10 |
| | | | 704/8 |
| 2014/0039870 A1* | 2/2014 | Roy | G06F 40/51 |
| | | | 704/2 |
| 2014/0142918 A1 | 5/2014 | Dotterer et al. | |
| 2018/0143975 A1 | 5/2018 | Casal et al. | |
| 2019/0155909 A1* | 5/2019 | Na | G06F 40/58 |

OTHER PUBLICATIONS

Mel, et al. "The NIST Definition of Cloud Computing". Recommendations of the National Institute of Standards and Technology. Nov. 16, 2015.

* cited by examiner

A. Sekou L. Remy is a Research Scientist at IBM Research Africa. A member of the lab's the Healthcare domain team, and the AI/ML horizontal team, he is excited about developing appropriate technologies which will transform Africa, and the world. Sekou loves learning, and is trained both in the Liberal Arts and Engineering. A proud alum of the Georgia Institute of Technology, and of Morehouse College (both in Atlanta, GA USA), Sekou has spent time learning and teaching at Clemson University, the University of Notre Dame, Spelman College, and at the University of Washington.

B. Sekou L. Remy ni Scientist Utafiti katika IBM Utafiti - Africa. Mwanachama wa timu za afya, yeye ni msisimko kuhusu teknolojia zinazofaa ambayo kubadilisha Afrika, na duniani, Sekou anapenda kujifunza, na ni mafunzo wote katika Liberal Arts na Uhandisi. Alum kujivunia institute Georgia ya Teknolojia, na ya Morehouse College (wote katika Atlanta, GA USA). Sekou metumia muda kujifunza na kufundisha katika chuo kikuu Clemson, Chuo Kikuu cha Notre Dame, Spelman College, na katika Chuo Kikuu cha Washington.

C. Sekou L. Remy ni mwanasayansi wa utafiti katika IBM utafiti -- Afrika. Mwanachama wa timu ya afya, yeye ni msisimko kuhusu kuendeleza teknolojia sahihi ambayo itakuwa kubadilisha Afrika, na dunia. Sekou anapenda kujifunza, na ni mafunzo katika sanaa liberalibus na uhandisi. Kulevyapamoja fahari ya taasisi ya teknolojia ya Georgia na Chuo cha Morehouse (wote katika Atlanta, GA USA). Sekou ametumia muda kujifunza na kufundisha katika Chuo Kikuu cha Clemson, Chuo Kikuu cha Notre Dame, Chuo cha Spelman, na katika Chuo Kikuu cha Washington.

TRANSLATION ENGINE SUGGESTION VIA TARGETED PROBES

BACKGROUND

The present invention relates generally to a translation-engine suggestion method, and more particularly, but not by way of limitation, to a system, method, and computer program product for using targeted probes to determine the translation engines which perform better when provided with input(s) similar to a given probe.

Often, there is a need to translate some text from one language to another for communication. There are various translation engines available in the internet.

The output of the conventional translation-engines is usually characterized by a loss of meaning after translation and also translations leading to wrong meanings. Therefore, a baseline for comparing translations is lacking.

Moreover, conventional translation techniques are only evaluated based on an output of the total translation rather than at a granular level (e.g., word, phrase/clause, and/or sentence level). Accordingly, translations are only compared based on their total output rather than at a granular level.

Figure 3:
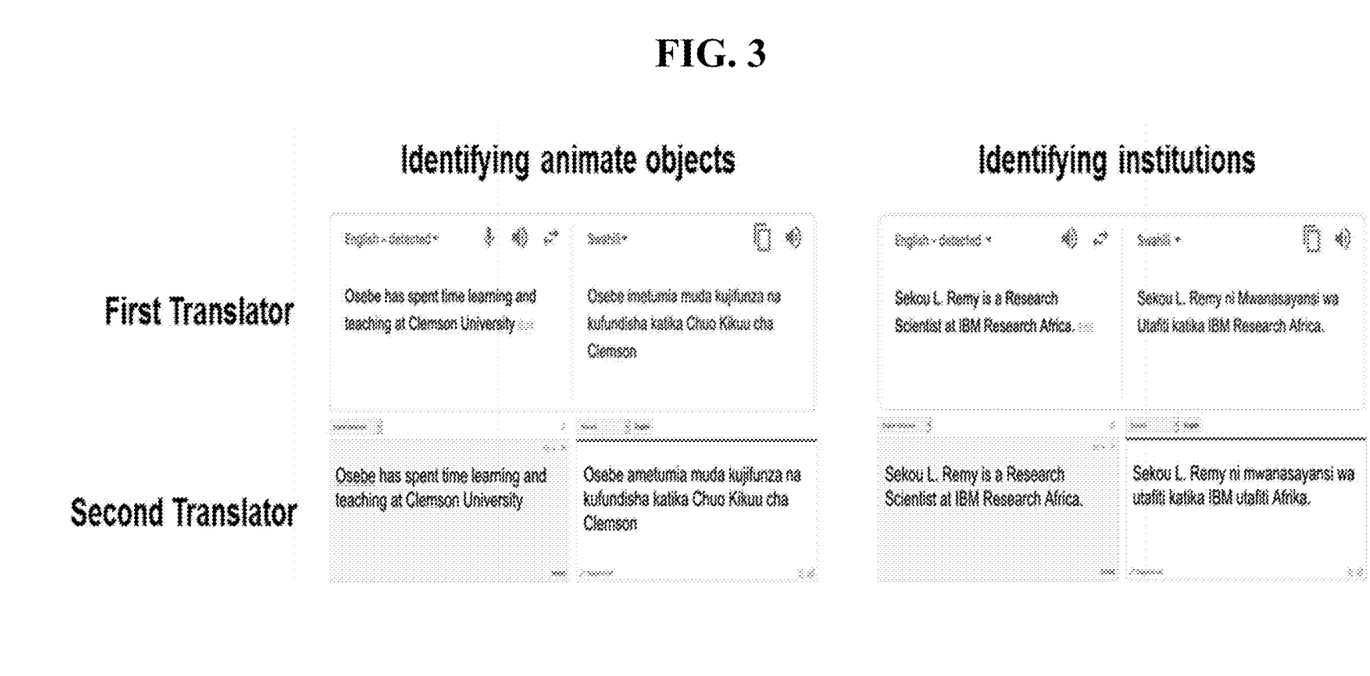
FIG. 3 exemplarily depicts better translations of the text of FIG. 2.

For example, as shown in FIGS. 2-3 where "A" is the original message in English, "B" is the Swahili translation using a first translator and "C" is the Swahili translation using a second translator, an analysis of the two translation reveals that in some phrases, the first translator performs better than the second translator (the first translator refers to Sekou as an inanimate object while the second translator is able to tell that Sekou is a person). On the other hand, the first translator seems to differentiate institution names, which need not be translated as shown in FIG. 3.

SUMMARY

In view of the problems in the art, the inventors have considered a new improved technique to insert a probe(s) into a translation-engine in order to determine accuracy at a granular level (e.g., a probe is a sentence (or clause or phrase or word) which has a desired translation) in order to recommend a combination of translation-engines to translate a paragraph of text (e.g., multiple sentences) using the optimal translation-engine for each sentence.

In an exemplary embodiment, the present invention provides a computer-implemented translation-engine suggestion method, the method including a computer-implemented translation-engine suggestion method, the method including identifying probes for third-party translation-engines for an input text, segmenting sections of the input text into a plurality of segments according to the identified probes, fragmenting the input text into fragments according to the segments, applying each fragment to the identified probe using the corresponding third-party translation-engine, and outputting a translation by combining each fragment.

One or more other exemplary embodiments include a computer program product and a system, based on the method described above.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily depicts example translations using a first translator engine and a second translator engine;

DETAILED DESCRIPTION

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
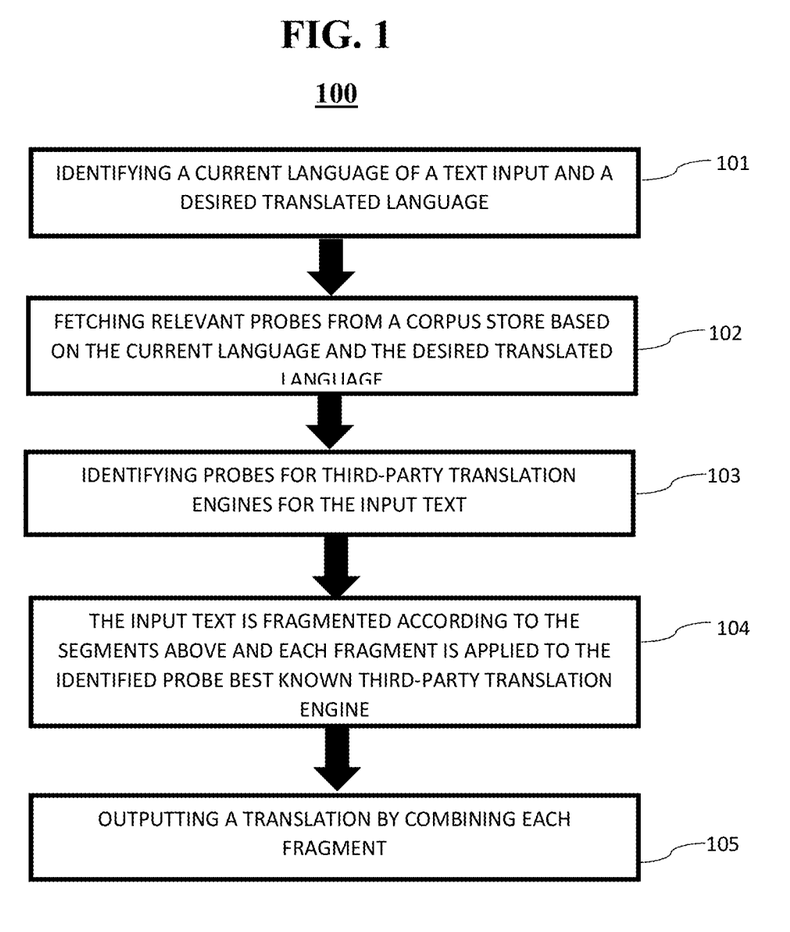
FIG. 1 exemplarily shows a high-level flow chart for a translation-engine suggestion method 100 according to an embodiment of the present invention.

By way of introduction of the example depicted in FIG. 1, an embodiment of a translation-engine suggestion method 100 according to the present invention can include various steps for determining a best translator for a given probe and recommending a combination of translators to translate a textual input.

Figure 5:
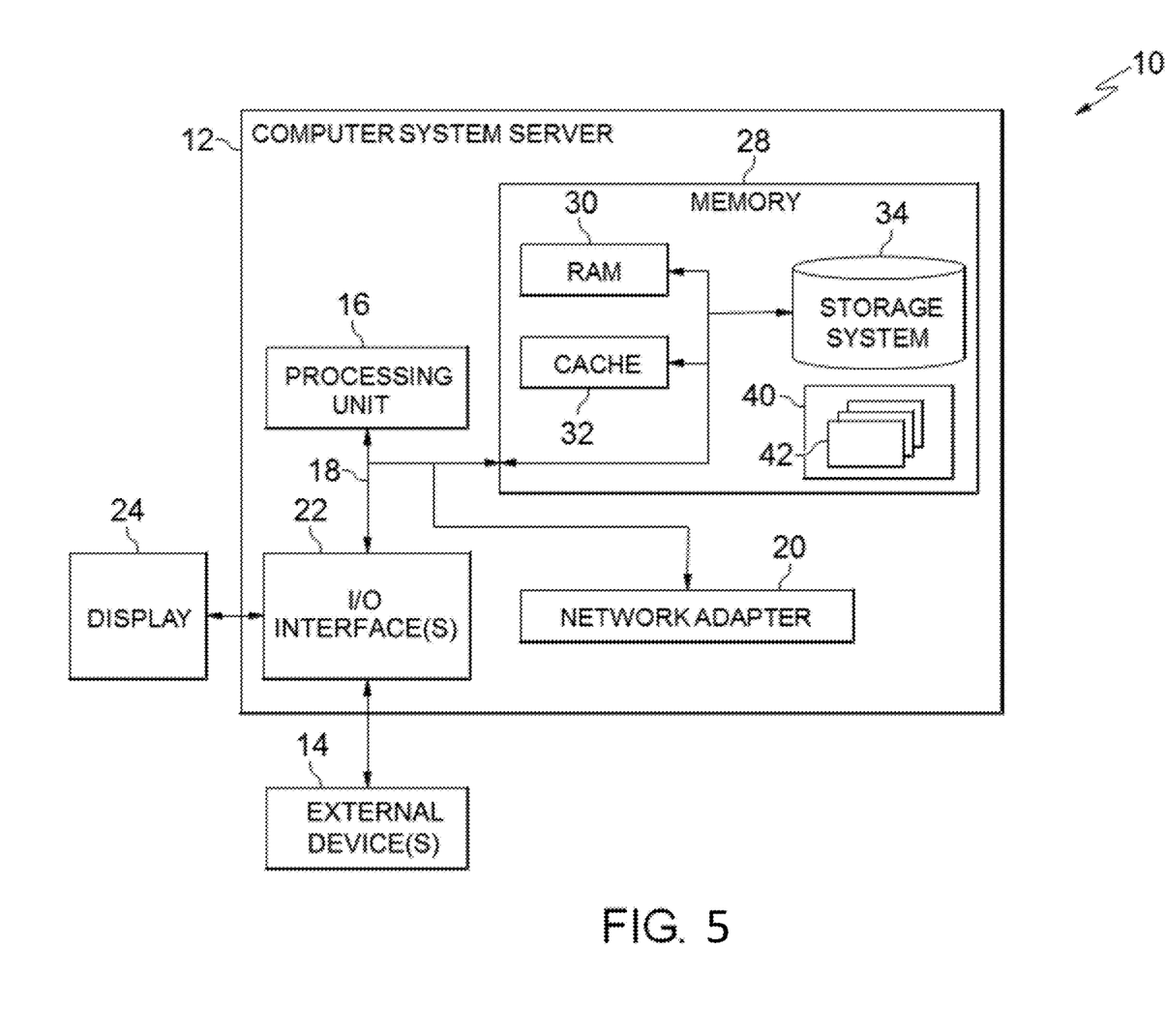
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 7), it is nonetheless understood that the present invention can be implemented outside of the cloud environment.

In general, a probe (or a plurality of probes) is used to evaluate the performance of translation engines for a plurality of semantic types. When a new text is provided to the system to be translated, it finds the probes with the highest semantic similarity for each segment of the text as predicted by a Siamese RNN network. A probe is a sentence (or clause or phrase or at its most granular, a word) which has a desired translation.

Figure 4:
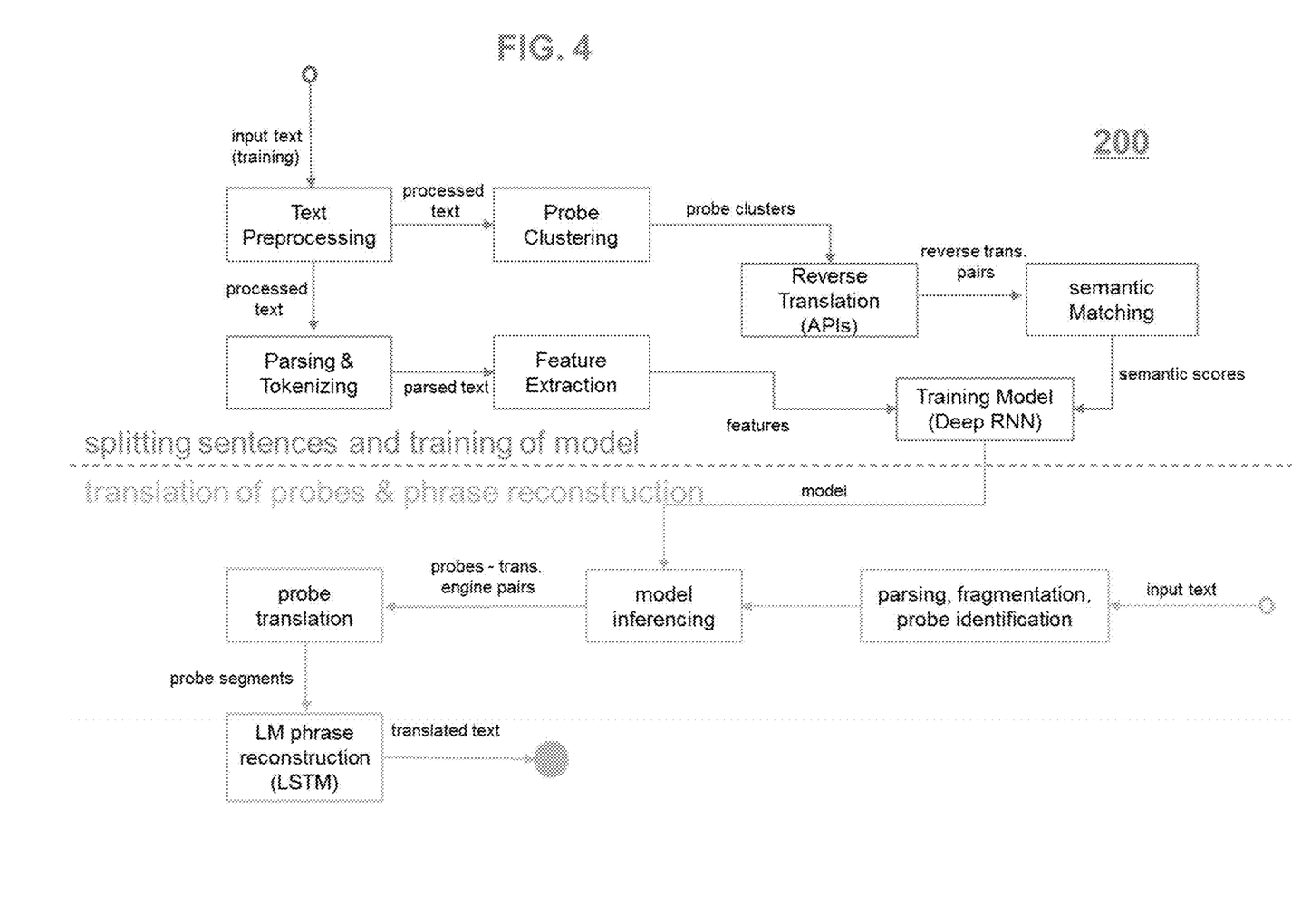
FIG. 4 exemplarily depicts a system architecture 200 according to an embodiment of the present invention.

With reference generally to FIGS. 1 and 4, in step 101, the current language of an input text and the user-desired translated language are identified. In step 102, a relevant probe(s) is/are fetched from a corpus store based on the current and desired translated languages. Human experts are involved in developing and verifying the corpus of probes. Probes are known "accurate" translations of a word, a group of words in a sentence, and/or a sentence from one language to another. A training exercise follows on the probes by running them through all the available machine translator services and a score of the output is computed based on the human expert probe translation. The probe and an ordered list of the machine translator services based on the score above are stored in the corpus of probes.

In step 103, the input text is passed through a parser, which identifies and segments different sections according to the fetched probe(s). That is, step 103 decomposes the input text into chunks (and the closest probe matching the chunks). The parser relies on scoring the similarity between sections of the text to a probe. The output is the text divided in several segments and each segment has an annotation for a probe. In other words, probes for third-party translation engines for the input text are identified by different segments of the text (e.g., a probe and translation engine combination for each segment (multiple probe and translation engine combinations)). The invention has access to third-party translation engines application programming interfaces (API) including Microsoft Translator™, Google Translate™, WorldLingo™, DeepL™, etc.

In step 104, the input text is fragmented according to the segments from step 103 (e.g., matching the different parts of the text to a segment) and each fragment is applied to the annotated probe best-known machine translator service. The "annotated probe's best-known machine translator" is learned over time by using the probes. For example, several probes are used for a segment and then the best one is verified. For multiple sentences, multiple translation engines can be used therefore. And, by annotating, the invention annotates different phrases of the text (e.g., segments) to be translated with a matching probe, and applies the better performing translation-engine on each of these individual annotated phrases.

In step 105, the translated segments are passed through a long short-term memory (LSTM) phrase reconstruction engine, which output the translated text. That is, the best translation for each segment is combined together to output the best translation across multiple translation engines using the probes (e.g., translate segments using multiple engines that may excel at a different part of the input text). In this manner, the user can obtain a best translation by combining translation APIs across multiple engines (i.e., determine the translation-engines which perform better when provided with input(s) similar to a given probe).

In one embodiment, in step 105, the input text for each probe is translated to an intermediate language before being translated to the final output language. Thereby, the invention learns the accuracy of the probes by including intermediate languages between translations (e.g., when translating from French to Swahili, it may avoid the direct translation (French to Swahili), but instead add English as an intermediary language (French to English to Swahili), etc.).

With reference to FIG. 4, the invention learns how to split sentences into segments and train the model to identify the best probes by processing input training text by tokenizing the input training text into sentences (or phrases, clauses or words) which are mapped onto a vector space using sentence embedding. The sentences are then clustered based on the embedding. The sentences at the center of the cluster (i.e., centroids) are identified and act as the cluster labels. A human expert translates the sentences at the centroids to the target language. The centroids are then sent to the different translation engines, and the translation is compared with the human expert's translation. Thereafter, the translation engines are scored using a metric such as bilingual evaluation understudy (e.g. BLEU or ROGUE). The sentence embeddings and translation metric scores are used to train a Recurrent Neural Network (RNN) semantic similarity model which will be used to map new sentences to the best engine for translation.

That is, sentence embedding(s) are obtained by performing a mean pool over the Glove embedding of each word in the segmented sentences from some text corpora. The embedding(s) are clustered using k means clustering where k is set to the number of probes needed to evaluate the system. The centroid of each cluster is mapped back to its original sentence and the set of k sentences are referred to as the probes. The probes (in the primary language) are sent to the translation engines and for each probe, engine pair we obtain an evaluation score (BLUE or ROGUE) is obtained by comparing with corresponding translations (in the secondary language) by an expert. The expert also provides a subjective Coherence score based on the grammatical underpinning of the language. The translated probes (from the engine) are then translated again back to the primary language by the expert and these are used to augment a semantic similarity dataset (e.g. the STS Benchmark). The dataset is then used to train a RNN based Siamese network (i.e., an artificial neural network using the same weights while working in tandem on two different input vectors to compute comparable output vectors) to perform semantic similarity matching setup as a binary classification task where the pairs of sentences are evaluated as being semantically equivalent or not. When a new sentence is provided to the system, it finds the probes with the highest similarity as predicted by the Siamese network.

It is noted that creation of probes may involve a human expert generating a list of probes based on their experiences with pair of languages under consideration.

Another technique to get probes is for a human expert generating a list of probes, based on their experiences with the pairs of languages under consideration.

The expert may also condition the clustering to be based on a list of probe types/labels.

As shown in the bottom of FIG. 4 in the translation of probes and phrase reconstruction, the input text to be translated is parsed into sentences, and each sentence is matched to a probe using a recurrent neural network (RNN) model which uses the embedding of the sentence to predict the cluster to which it belongs. This provides for checking the similarity of new sentences with existing clustered probes. Further, each cluster is associated with a translation engine via a web application programming interfaces (APIs) and the sentence is passed through this translation engine to obtain a translation. The sentences are then combined into a paragraph and provided to the user.

It is noted that creation of probes may involve a human expert generating a list of probes based on their experiences with pair of languages under consideration.

Thereby, the invention may segment a text into multiple sentences, identify the semantic type of each sentence and based on the best matching probe assign a previously determined best translation engine for such corresponding probes to each sentence while ensuring that the combination of translations from all assigned engines are semantically and syntactically accurate translations of the entire text.

In one embodiment, as an example of probes based on a biography corpus, the following sentence is identified as the centroid of a cluster after clustering the sentence embedding of the corpus:

"Osebe has spent time learning and leaching at Clemson's university."

The sentence is used as a probe and sent to a First translator and a Second translator. As seen in FIG. 3. The second translator is evaluated lower than the first translator.

For a new sentence to be translated (e.g., "Victor has spent his time learning at Carnegie Mellon's University"), the invention system would choose the First translator as the preferred translator.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
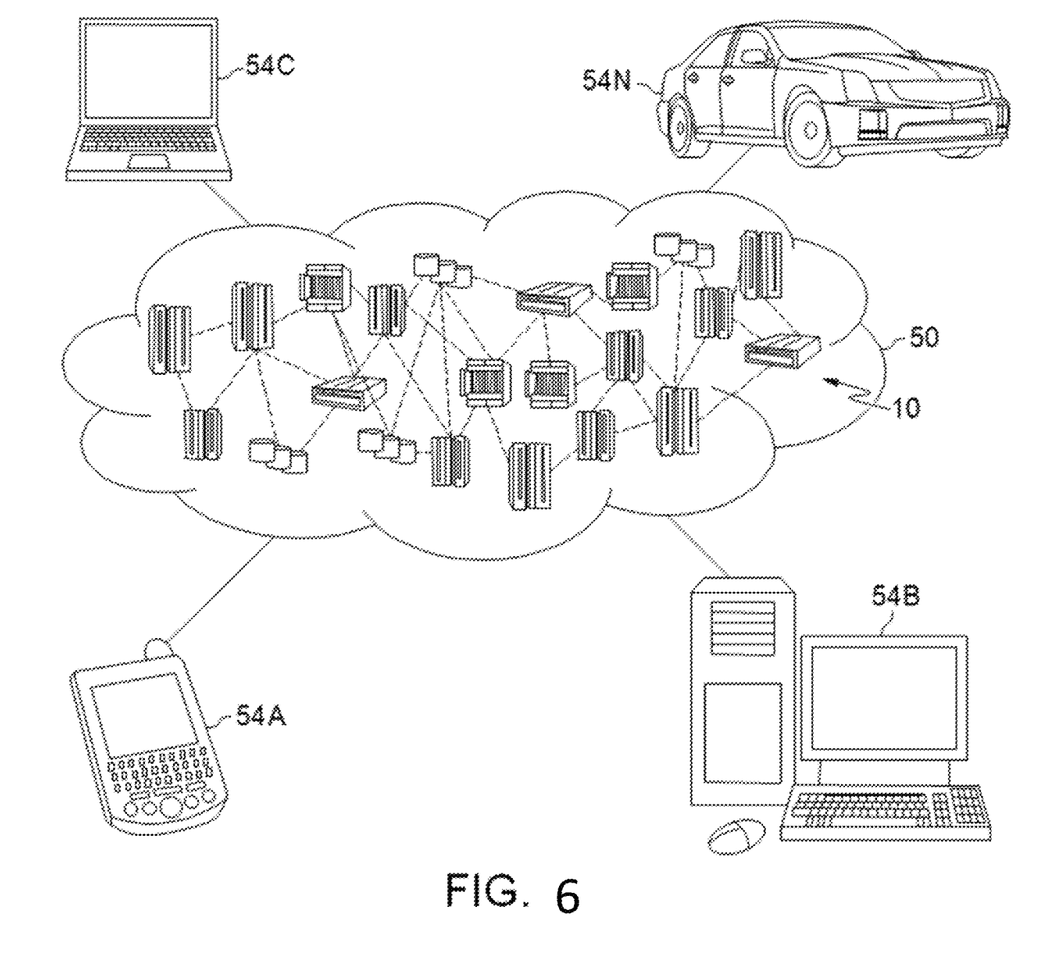
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
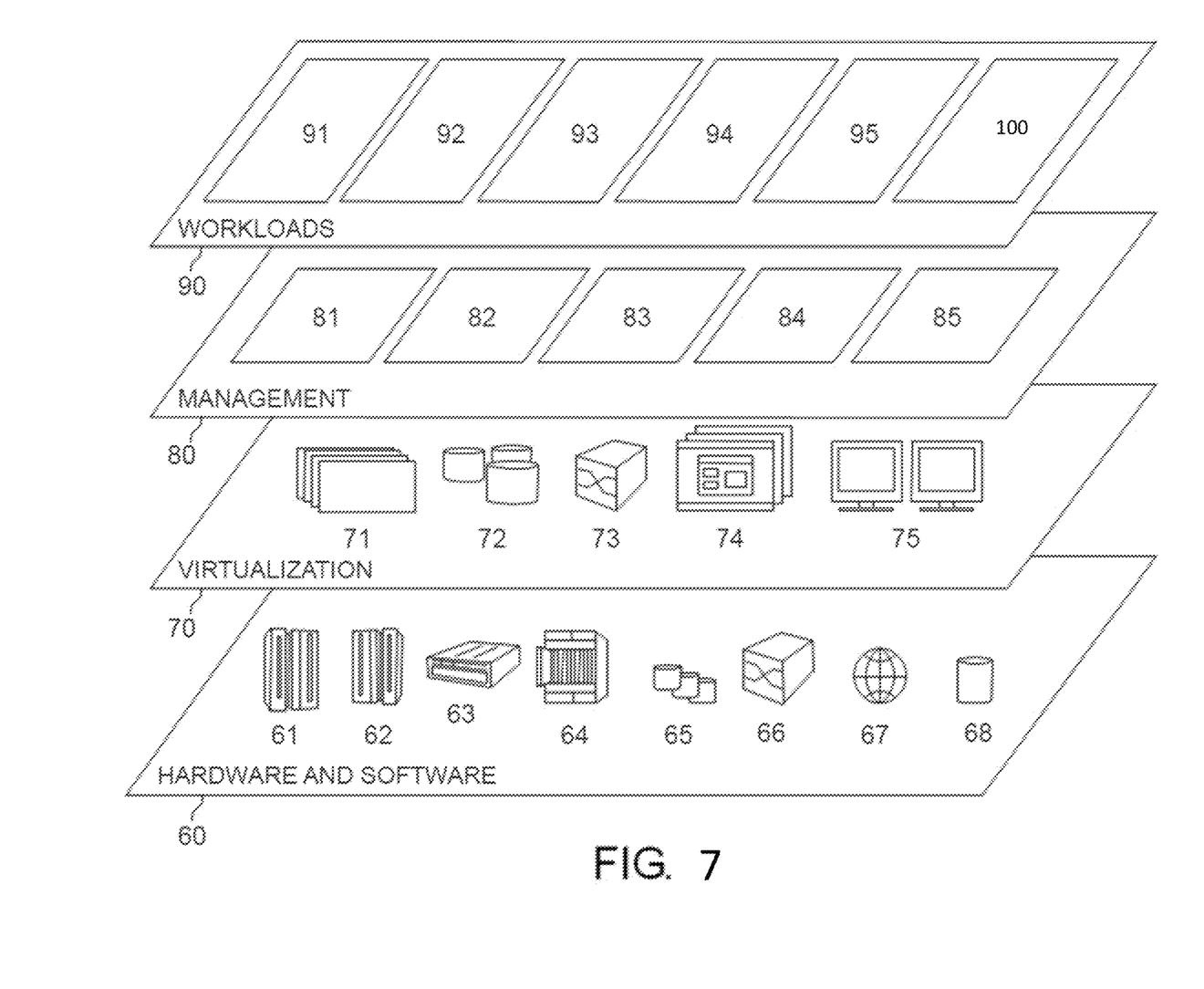
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and translation-engine suggestion method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented translation-engine suggestion method, the method comprising:
    segmenting sections of an input text into a plurality of segments;
    fragmenting the input text into fragments according to the segments;
    identifying a plurality of combinations where each combination includes a probe for a third-party translation-engine, the probe having a highest semantic similarity for each segment of the input text as predicted by a Siamese recurrent neural network (RNN) and the probe being a correct translation of the fragment;
    applying each fragment to each of the combinations of the probe and the third-party translation-engine to verify a best combination of the plurality of combinations for the fragment that results in a best translation for the fragment that comes from the probe of the third-party translation-engine as compared with other combinations applied to the same fragment; and
    outputting a translation of the input text by combining the best translation from each of the combinations of the probe and the third-party translation engine that results in the best combination for each fragment.

2. The method of claim 1, wherein a process for segmenting the sections of the input text and training a model to identify the probe and third-party translation-engine combination is learned by processing input training text by tokenizing the input training text into sentences which are mapped onto a vector space using sentence embeddings.

3. The method of claim 1, wherein a process for segmenting the sections of the input text and training a model to identify the probes are learned by processing input training text by tokenizing the input training text into sentences,
    wherein the sentences are clustered and the sentences at a centroid of the cluster are identified to act as cluster labels,
    wherein a human expert translates the sentences at the centroids into a target language and the centroids are sent to different third-party translation engines, and
    wherein the translation is compared to the human expert translation of the centroid, and
    wherein each of the different third-party translation engines is scored based on a metric comparing a result of the comparing.

4. The method of claim 2, wherein the sentences are clustered based on the sentence embedding, and
    wherein the sentences at a center of the cluster are identified and are assigned as a cluster label.

5. The method of claim 2, wherein the sentence embeddings are obtained by performing a mean pool over a Glove embedding of each word in the segmented sentences,
    wherein the sentence embeddings are clustered via k means clustering where k is set to the number of probes needed to evaluate the third-party translation engines, and
    wherein a centroid of each cluster is mapped back to the pre-translated input text and the set of k sentences are the probes.

6. The method of claim 4, further comprising querying a human expert to translate the sentences at the centroid to a target language.

7. The method of claim 6, wherein the applying each fragment to the identified probe using the corresponding third-party translation-engine is compared with the human expert translation.

8. The method of claim 7, wherein the third-party translation-engines are scored based on a result of the comparison, and
    wherein the applying applies a highest scored third-party translation-engine for each segment.

9. A computer program product for metadata-based characterization, the computer program product comprising a computer-readable storage medium having program instructions embodied therewith, the program instructions executable by a computer to cause the computer to perform:
    segmenting sections of an input text into a plurality of segments;
    fragmenting the input text into fragments according to the segments;
    identifying a plurality of combinations where each combination includes a probe for a third-party translation-engine, the probe having a highest semantic similarity for each segment of the input text as predicted by a Siamese recurrent neural network (RNN) and the probe being a correct translation of the fragment;
    applying each fragment to each of the combinations of the probe and the third-party translation-engine to verify a best combination of the plurality of combinations for the fragment that results in a best translation for the fragment that comes from the probe of the third-party translation-engine as compared with other combinations applied to the same fragment; and
    outputting a translation of the input text by combining the best translation from each of the combinations of the probe and the third-party translation engine that results in the best combination for each fragment.

10. The computer program product of claim 9, wherein a process for segmenting the sections of the input text and training a model to identify the probe and third-party translation-engine combination is learned by processing input training text by tokenizing the input training text into sentences which are mapped onto a vector space using sentence embeddings.

11. The computer program product of claim 10, wherein the sentences are clustered based on the sentence embedding, and
wherein the sentences at a center of the cluster are identified and are assigned as a cluster label.

12. The computer program product of claim 11, further comprising querying a human expert to translate the sentences at the centroid to a target language.

13. The computer program product of claim 12, wherein the applying each fragment to the identified probe using the corresponding third-party translation-engine is compared with the human expert translation.

14. The computer program product of claim 13, wherein the third-party translation-engines are scored based on a result of the comparison, and
wherein the applying applies a highest scored third-party translation-engine for each segment.

15. A metadata-based characterization system, the system comprising:
a processor; and
a memory, the memory storing instructions to cause the processor to perform:
segmenting sections of an input text into a plurality of segments;
fragmenting the input text into fragments according to the segments;
identifying a plurality of combinations where each combination includes a probe for a third-party translation-engine, the probe having a highest semantic similarity for each segment of the input text as predicted by a Siamese recurrent neural network (RNN) and the probe being a correct translation of the fragment;
applying each fragment to each of the combinations of the probe and the third-party translation-engine to verify a best combination of the plurality of combinations for the fragment that results in a best translation for the fragment that comes from the probe of the third-party translation-engine as compared with other combinations applied to the same fragment; and
outputting a translation of the input text by combining the best translation from each of the combinations of the probe and the third-party translation engine that results in the best combination for each fragment.

16. The system of claim 15, wherein a process for segmenting the sections of the input text and training a model to identify the probe and third-party translation-engine combination is learned by processing input training text by tokenizing the input training text into sentences which are mapped onto a vector space using sentence embeddings.

17. The system of claim 16, wherein the sentences are clustered based on the sentence embedding, and
wherein the sentences at a center of the cluster are identified and are assigned as a cluster label.

18. The system of claim 17, further comprising querying a human expert to translate the sentences at the centroid to a target language.

19. The system of claim 18, wherein the applying each fragment to the identified probe using the corresponding third-party translation-engine is compared with the human expert translation.

* * * * *